US006112424A

United States Patent [19]

Friend

[11] Patent Number: 6,112,424

[45] Date of Patent: Sep. 5, 2000

[54] TILE MARKING DEVICE INSTRUMENT BOARD

[76] Inventor: Howard Lee Friend, c/o Tommy Friend 7830 W. Lamar Rd., Glendale, Ariz. 85303

[21] Appl. No.: 09/044,510

[22] Filed: Mar. 18, 1998

[51] Int. Cl.$^7$ ...................................................... G01B 1/00

[52] U.S. Cl. ...................................... 33/527; 33/DIG. 20

[58] Field of Search .............................. 33/23.02, 23.08, 33/26, 526, 527, DIG. 20

[56] References Cited

U.S. PATENT DOCUMENTS

| | | | |
|---|---|---|---|
| 1,619,091 | 3/1927 | Rieser | 33/DIG. 20 |
| 2,144,697 | 1/1939 | Zangrando | 33/527 |
| 2,796,665 | 6/1957 | Cossock | 33/23 |
| 3,548,505 | 12/1970 | Candilo | 33/527 |
| 3,611,579 | 10/1971 | Reid | 33/174 G |
| 3,643,335 | 2/1972 | Smith | 33/42 |
| 3,718,980 | 3/1973 | Poulos | 33/526 |
| 4,827,625 | 5/1989 | Le Moal | 33/527 |
| 4,860,723 | 8/1989 | Fortin | 33/526 |
| 4,899,455 | 2/1990 | Bovino et al. | 33/527 |
| 4,928,391 | 5/1990 | Higgins | 30/293 |
| 5,038,490 | 8/1991 | Armstrong | 33/527 |
| 5,181,326 | 1/1993 | Eberline | 33/527 |
| 5,188,013 | 2/1993 | Cardinale | 83/879 |
| 5,361,508 | 11/1994 | Ruggiero | 33/527 |
| 5,471,758 | 12/1995 | White, Sr. | 33/527 |
| 5,483,749 | 1/1996 | Hepworth | 33/527 |

FOREIGN PATENT DOCUMENTS

| | | | |
|---|---|---|---|
| 2185115 | 7/1987 | United Kingdom | 33/527 |

*Primary Examiner*—G. Bradley Bennett

[57] ABSTRACT

An instrument board (21) with a thin base (26) and top surface of base for placing tile to be measured for cutting, tracks (27) at front and rear atop base and tile placing surface between tracks, a pilot hole (31) in both ends of each track, a pair of measuring arms (23) that insert into pilot holes at sides of board with a peg (25) in each arm at measuring point (38), a straight edge (24) is placed at measuring points (38) on arms for a reference line (37) and a sliding member (22) that attaches to tracks, a measuring arm (23A) that installs into sliding member to measure uneven structure bases for tile laying and a corner measuring arm (23B) that installs into sliding member to measure corner area for tile laying and alignment guides (28) to align board front and alignment marks (29) to align board sides with seams of laid tile and a cutting surface (32) insert that installs atop base for cutting vinyl flooring tile, a spacer (33) and a spacer (34) for reducing width of tile placing area atop base, to provide sizing for ceramic tiles of different sizes.

10 Claims, 10 Drawing Sheets

*Fig. 9*
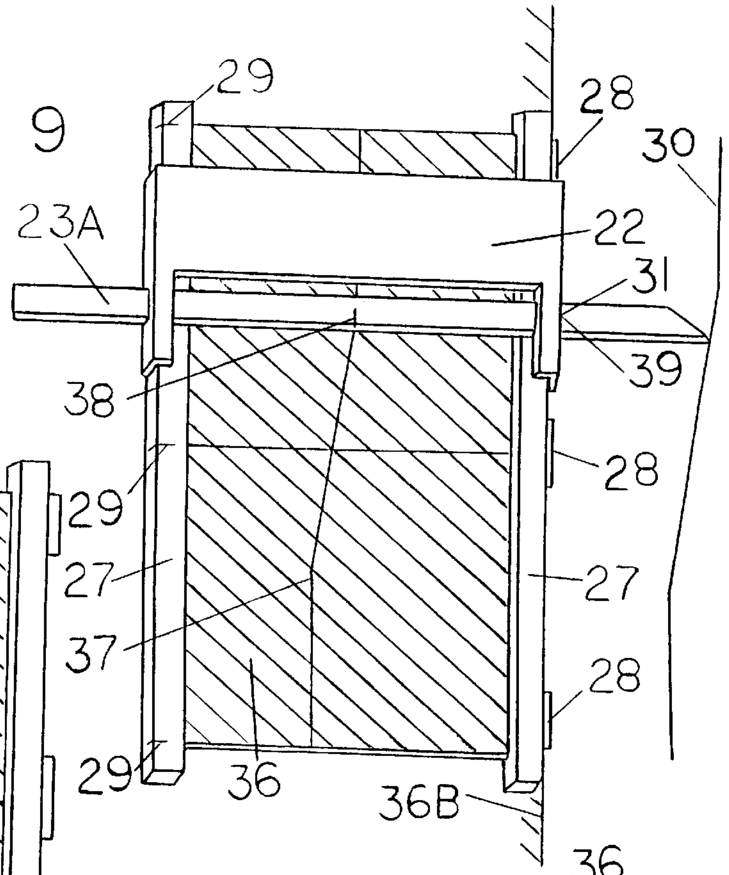
*Fig. 10*
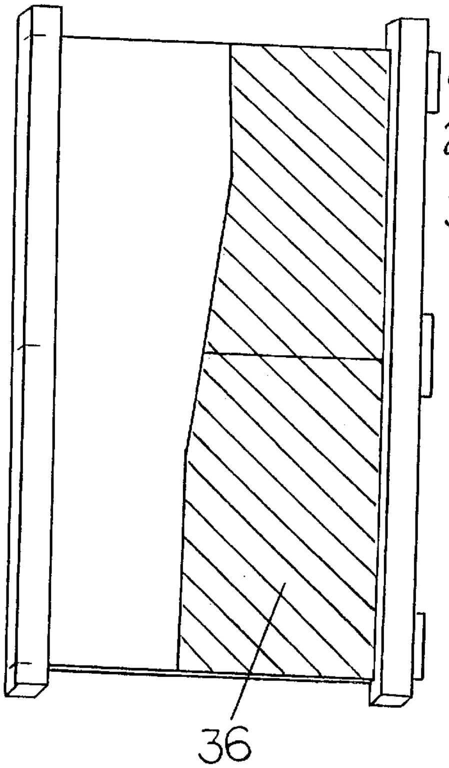
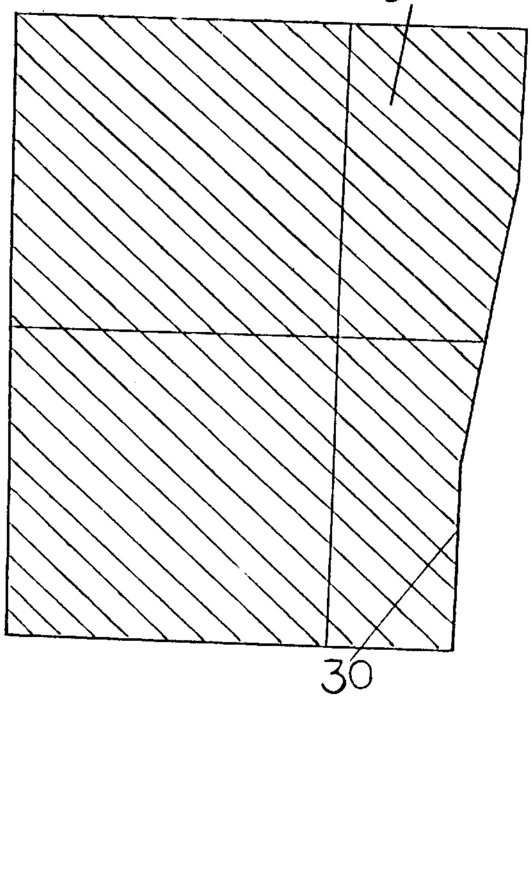
*Fig. 11*

TILE MARKING DEVICE INSTRUMENT BOARD

BACKGROUND

1. Field of Invention

The present invention relates generally to measuring devices and specifically to tile measuring devices for marking tiles for laying.

2. Description of Prior Art

Laying floor tiles is time consuming and difficult. The most difficult process is cutting tiles to lay adjacent to structure bases such as walls, cabinets and corner areas. The traditional method is to lay the major portion of a floor with whole uncut tiles. The surface area between the laid tile and structure base is then measured with a tape measure. The measurements are transfered onto tile and tile is cut to those measurements. To lay tile into such areas. Thereafter, inventors have created several types of tile marking devices for measuring areas adjacent to walls and other structures. Such as U.S. Pat. No. 5,471,758 to White Sr. (1995) discloses a complex device. The device aligns with grout lines of laid tile and locks down with bolts for measuring. The device is useful for vertical walls, however it adjusts to ceramic tile only. The device would be slow for measuring flooring tiles. The device would have to be adjusted constantly with bolts for every measurement made. U.S. Pat. No. 3,643,335 to Smith (1972) discloses a device with a base that sets atop tile for measuring with a finger type arm for reference. The whole device is slid across tile being measured for laying. The method used with this device would make it difficult if not impossible to keep the tile being measured in position. The tile being measured would have a tendency to slid away when the base is slid over for measuring. U.S. Pat. No. 2,796,665 to R. Cossock (1957) discloses a device with a narrow base for support of a tubular measurement arm. The device has an accurate measuring stystem. The device does not have an arm squaring member to keep the front portion of arm aligned. The arm would have a tendency to slide out of alignment and lose accuracy.

Several devices attempt to solve the problems of measuring for tiles adjacent to structure bases. The devices lack many features to make this possible. Devices must be held square with laid tile edges. Tile being marked for laying must be held in position while being marked and keep from sliding away. The measurement must follow a straight line from arm reference tip to marking point reference on arm. The arm must be held square with laid tile to have reliable measurements. The devices of present use do not provide these features. The features the devices lack are needed to provide the many needed functions for a reliable and accurate marking device for tile. The features and functions are included in the present invention in a combination of instruments and instrument board.

OBJECTS AND ADVANTAGES

Accordingly, besides the objects and advantages of marking devices for tile described above, several objects and advantages of the present invention are:

A. To provide a instrument board, that in combination with tile measuring devices, that have many features and solve many problems associated with laying tile adjacent to structure bases.

B. To provide an instrument board that is held square with work surface for accurate measurements.

C. To provide simple easy to use devices for measuring and marking tiles for laying adjacent to walls, corners and other obstacles.

D. To provide much faster and more reliable devices than those in present use.

E. To provide for different types and sizes of tile for measuring and marking.

F. To provide a cutting surface for vinyl flooring tile.

G. To provide a holder atop base of instrument board so that tile placed onto base is held in position while being measured or cut.

H. To provide devices that will measure uneven structure bases such as curves, dents and corner areas.

DRAWING FIGURES

In the drawing, closely related figures have the same number but different alphabetic suffixes.

FIG. 1 Shows the instrument board, measuring arms and sliding arm squaring member.

FIG. 2 Front view of instrument board and it's spacer inserts and an example of measuring arm references.

FIG. 3 Side view of instrument board and spacer inserts and example of tile being held upon base.

FIG. 3*b* Example of using a measuring arm to measure for tile.

FIG. 4 Front view of instrument board with end measuring arms.

FIG. 9,10,11 Illustrates top side view of laying tile using sliding member and measuring arm.

Figure 12:
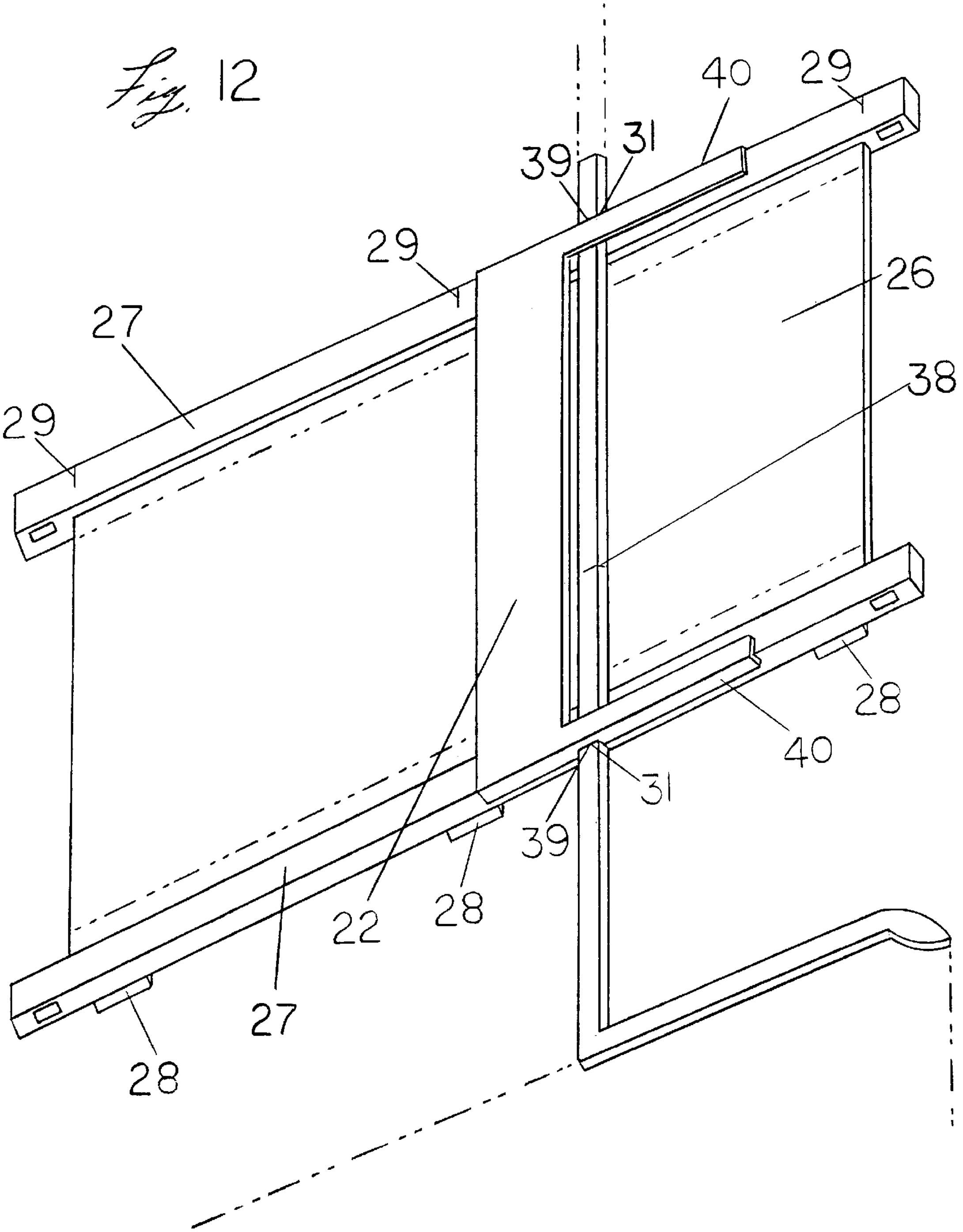

FIG. 12 Front view of sliding member and corner measuring arm.

Figure 13:
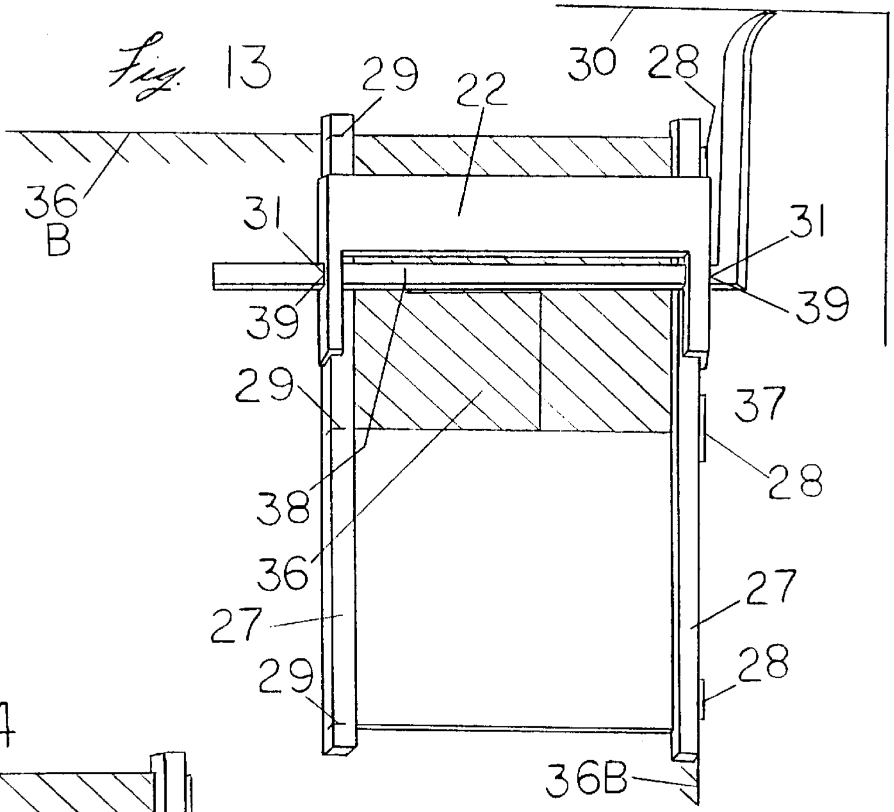
Figure 14:
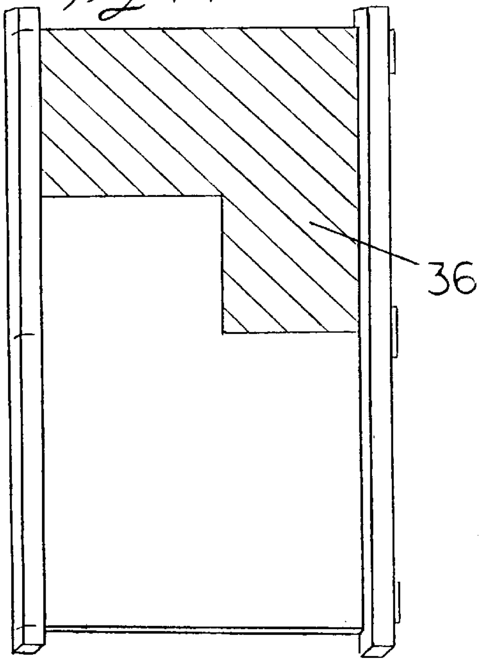
Figure 15:
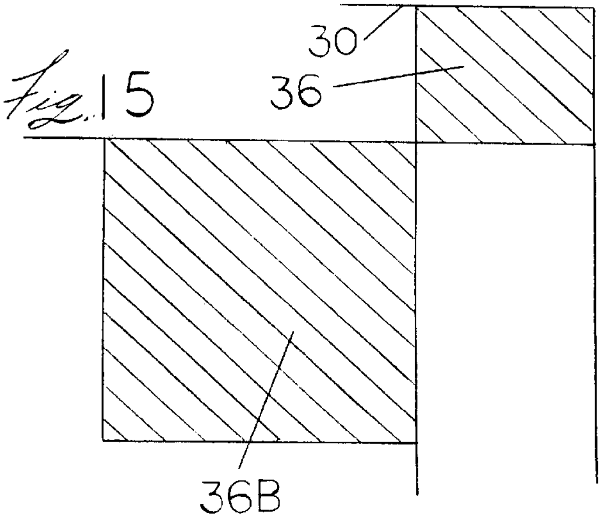

FIG. 13,14,15 Illustrates top side view of laying tile using sliding member and corner measuring arm.

REFERENCE NUMERALS IN DRAWING

| Reference numerals in drawing | |
|---|---|
| 21. instrument board | 32. cutting surface insert |
| 22. sliding member | 33. ¼ × 6" × 24" spacer reducer |
| 23. end measuring arms | 34. ¼ × 4" × 24" spacer reducer |
| 23A. Measuring arm for sliding member | 35. example of measuring arm |
| | 36. tile |
| 23B corner measuring arm | 36B previous laid tile |
| 24. straight edge | 37. tile is cut along line |
| 25. small pegs | 38. measuring point on arms |
| 26. ⅛" × 12" × 24" base (work surface) | 38B. measuring points for various sizes of tile |
| 27. tracks | 39. notches on sliding member |
| 28. alignment guides | 40. overhangs |
| 29. alignment marks | 41R. =4" |
| 30. wall line | 42R. =13" |
| 31. pilot holes | 43R =1" |
| | 45A. tile laying area |

SUMMARY

In accordance with the present invention an instrument board in combination with tile measuring devices for measuring various regularity of structure bases for laying tile of differing sizes and types into surface area adjacent to such structure bases.

Description-Figs 1,2,3,4,8,12

A typical embodiment of the tile marking device instrument board 21 and related implements is illustrated in FIG.

1 (front view). The board and implements can be manufactured from hard plastic, wood, metal or other rigid materials. The instrument board 21 FIG. 2 front view has a thin base 26 and tracks 27 at front and rear of board. Pilot holes 31 are at the ends of the tracks. Alignment guides 28 are at center and toward track ends of front track with a ⅛" overhang of base. Base 26, tracks 27 and alignment guides 28 are all incorporated into one solid part, reffered to as the instrument board 21, (see FIG. 1).

Measuring arms Reference

Figure 1:
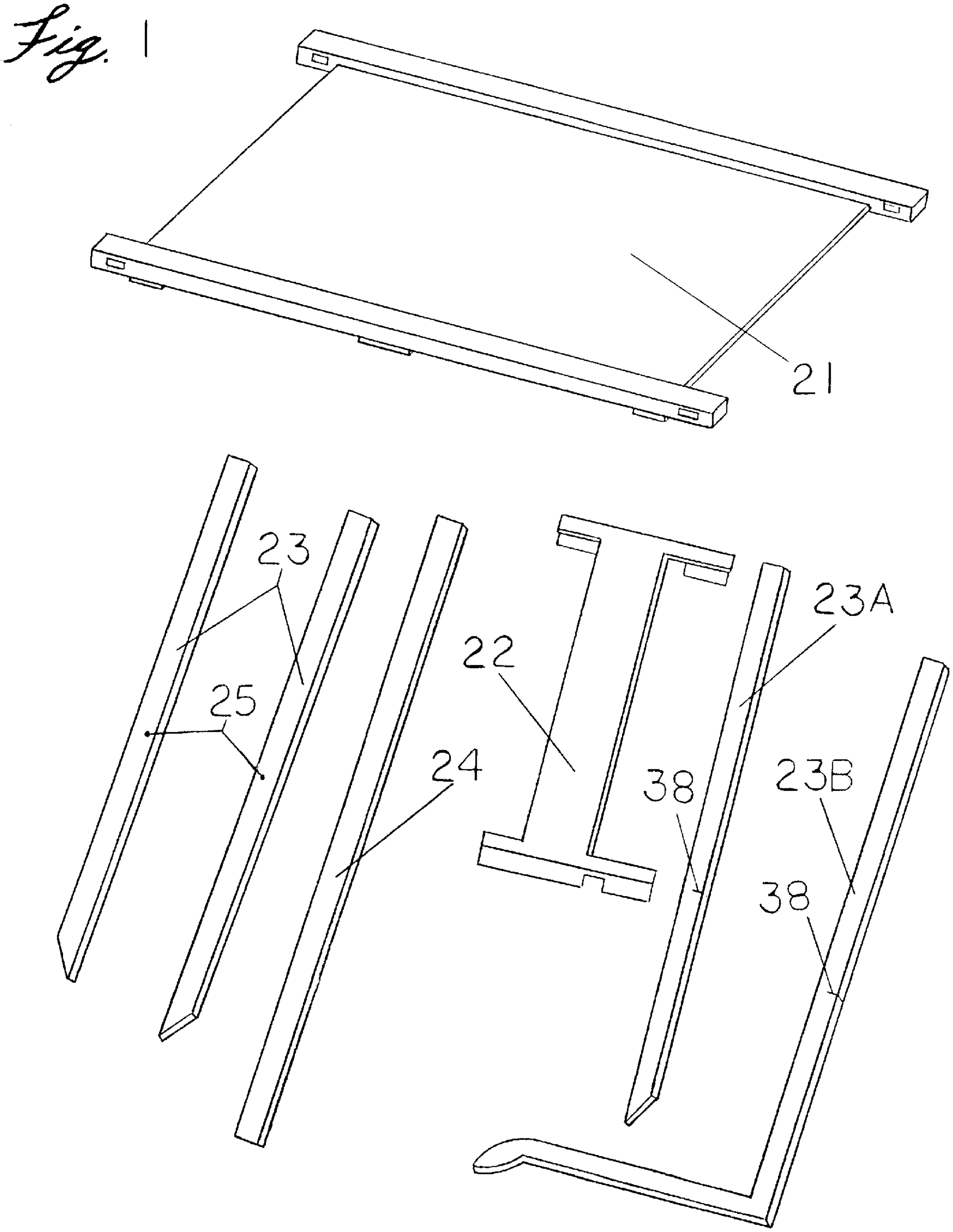
Figure 2:
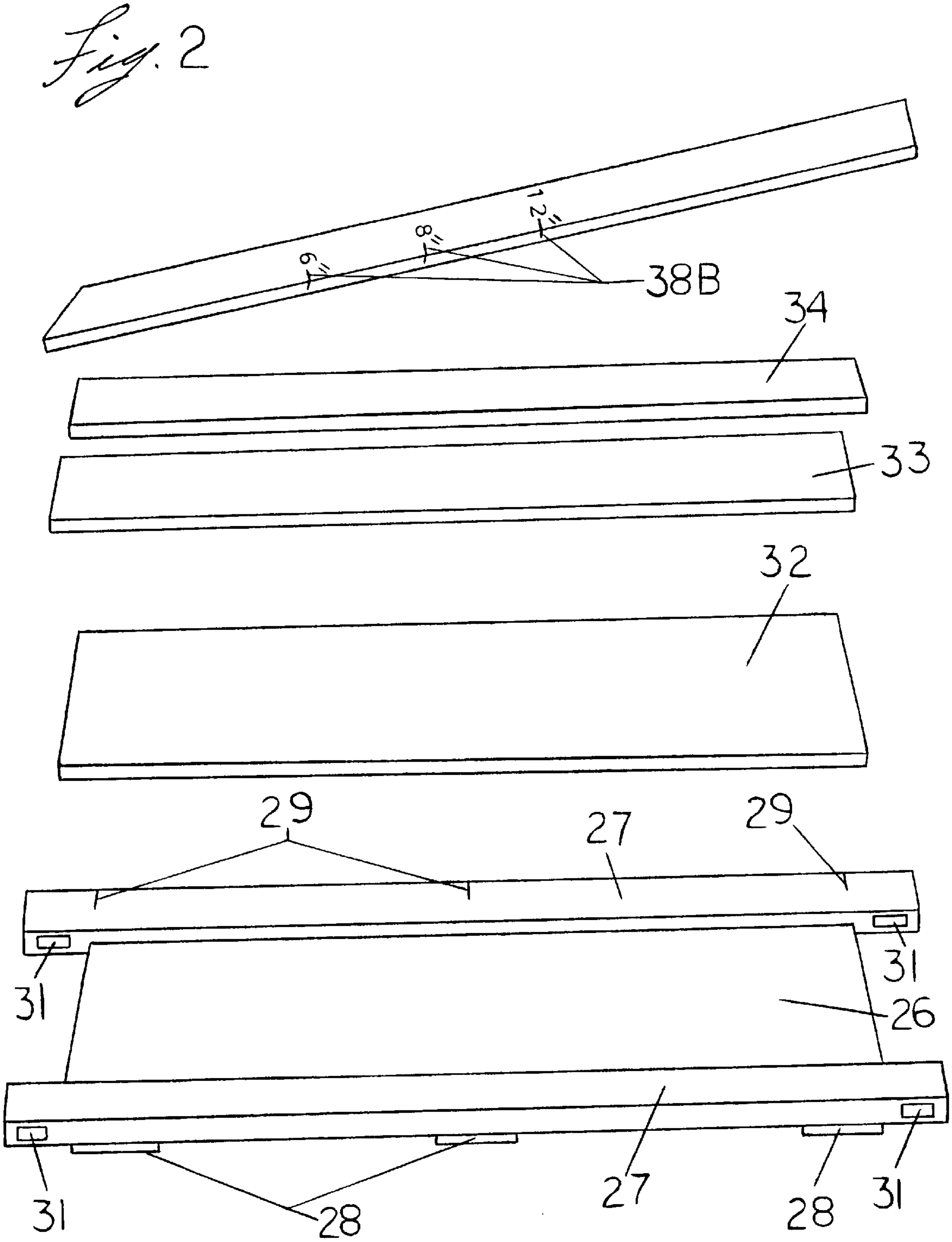

Tile placed into instrument board is measured with measuring arms (FIG. 2). Illustration of a measuring arm 35 depects different measuring points 38B, FIG. 2 shows references for different sizes of tile. Measuring arms 23A,23B use marks at measuring points and arms 23 use small pegs 25 installed into arms at measuring points. Illustrations show measuring points 38 for 12"×12" tile.

Alignment of board

Figure 3:
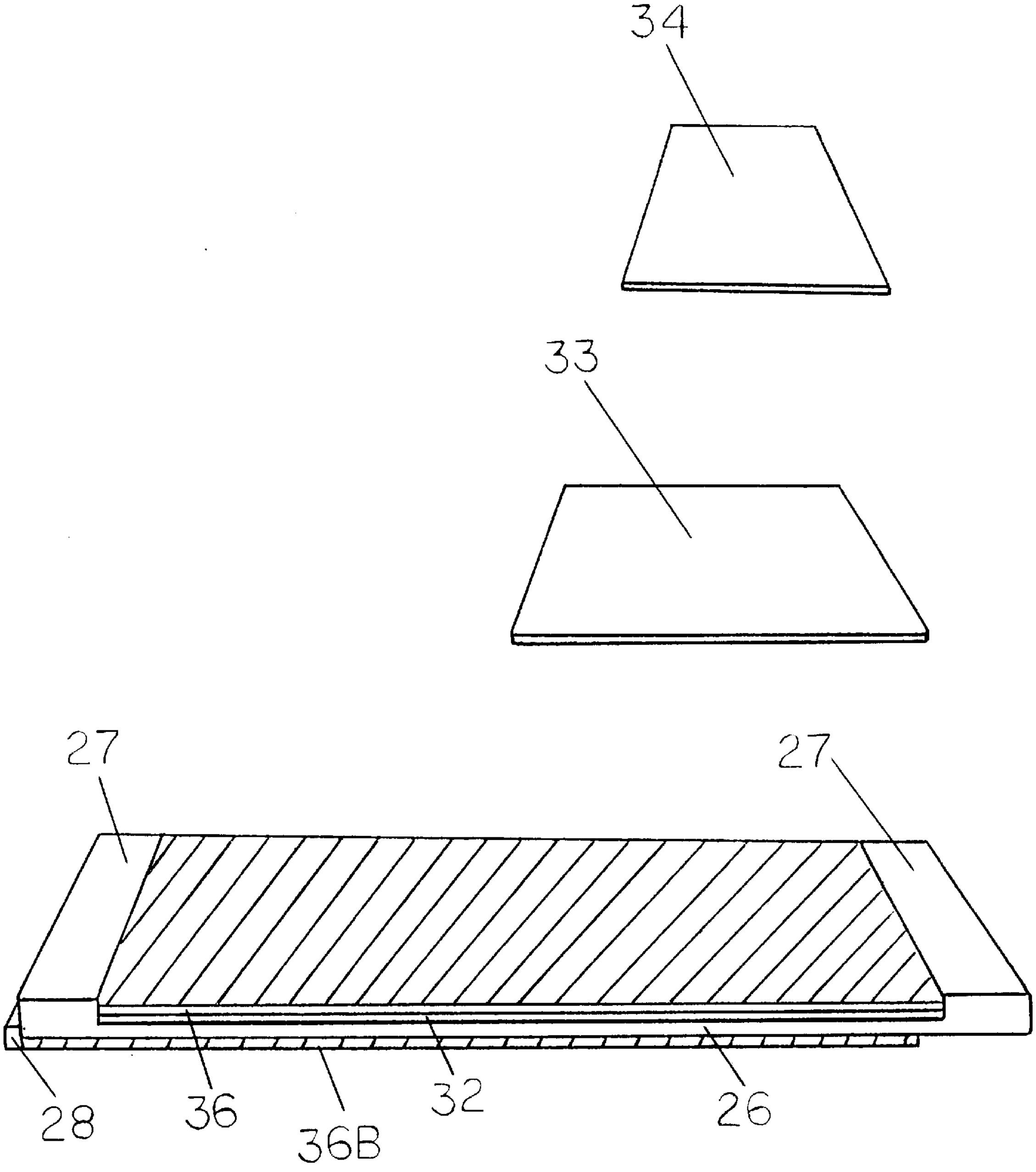
Figure 3B:
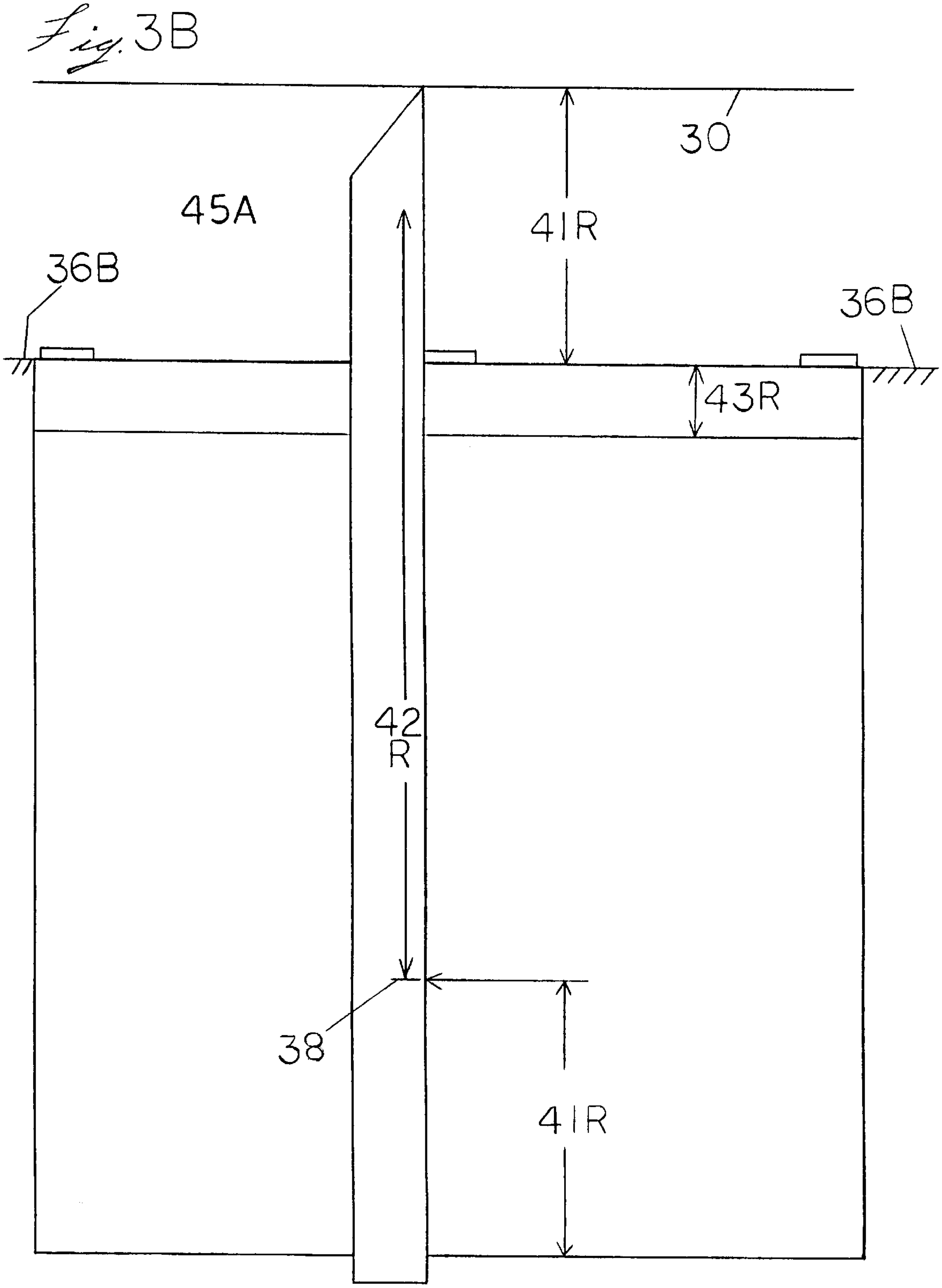
Figure 4:
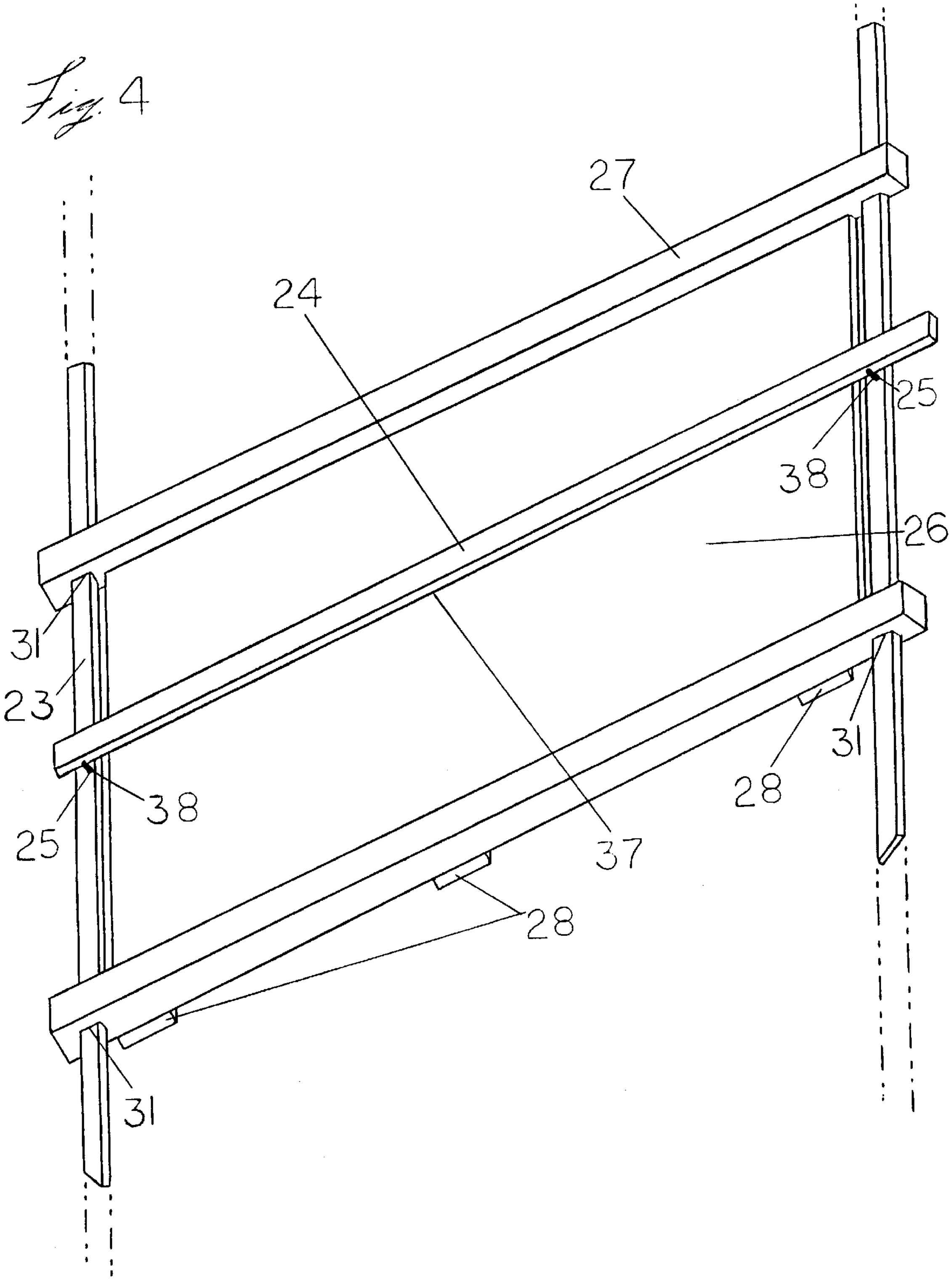

Alignment of board for board operation. Aligning with previously laid tile, alignment marks 29 FIG. 2 are etched into rear track for this purpose. Alignment guides 28 FIG. 3 are gripping points at front of board. An illustration is shown in FIG. 3 of guides 28 in contact, snubbed against laid tile 36B. Entire front of board is aligned with laid tile using guides. Alignment marks 29 on rear of board are aligned with seams of previously laid tile 36B.

Board inserts FIGS. 2,3

A cutting surface (⅛"×12"×24") insert 32 is for cutting vinyl flooring tile. The insert 32 is installed into board over base 26 to provide cutting suface for tile 36. See FIG. 3 sideview. Tracks 27 hold inserts and tile square in board. To reduce width of tile holding space upon base for ceramic tiles of different sizes, spacer inserts are installed into board. Spacer insert 33 (¼'×6"×24") is installed over base 26 against back of board against rear track 27. To create a ¼"×6"×24" space at front of board for 6" ceramic tile. A spacer insert 34 ¼"×4"×24" is installed in back of board over base 26 for 8" ceramic tile. Spacer inserts create an area where tile is held at front of board and square with board for measuring.

End measuring arms

Measuring arms are held square with board for accurate measurements. End measuring arms 23 are inserted into pilot holes 31. Pegs 25 are in arms 23 at reference point 38 for 12" tile, shown in drawing. Straight edge 24 is placed atop arms and against backside of pegs. This is the measuring position. See FIG. 4.

Figure 8:
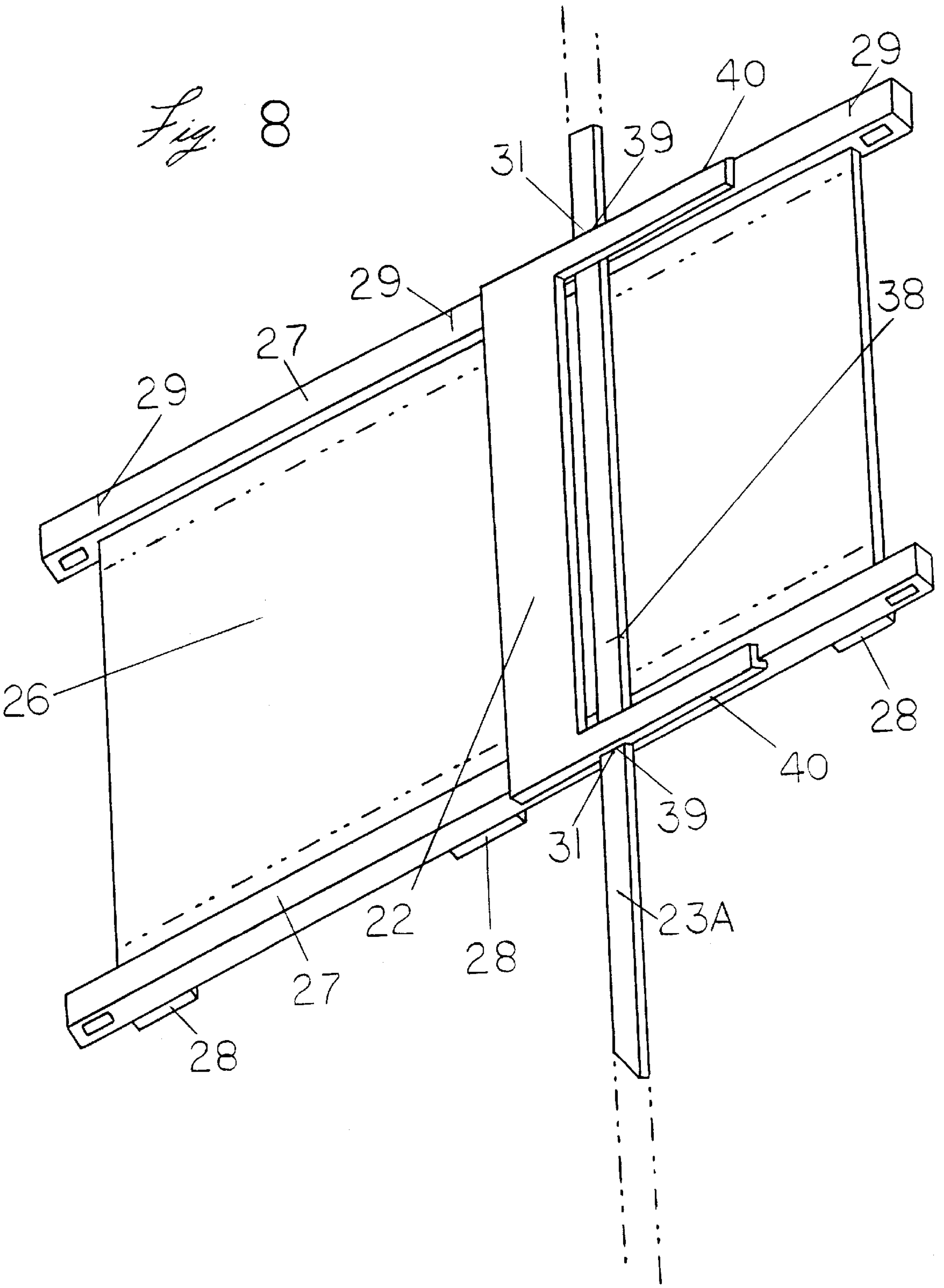
FIG. 8 Illustrates front view of sliding member (sliding arm squaring member) with measuring arm.

Measuring arm and sliding member FIG. 8

A measuring arm 23A is placed atop tracks 27 with a sliding member 22 placed atop arm. Notches 39 on sliding member 22 cover arm. Sandwiching arm between tracks creating pilot holes 31. The measuring arm slids between tracks and notches inside the pilot holes. Overhangs 40 lap over tracks 27 making sliding member and arm square and in alignment with board. The slider 22 can then be slid back and forth on the board. The arm extends and retracts to measure.

Corner measuring arm & sliding member FIG. 12

A measuring arm 23B installs in the same manner as arm 23A, the previous arm. The arm has a 90 degree elbow and an arm extension with a off-set probing point for corner wall areas.

From the description above a number of advantages of my tile marking device instrument board becomes evident.

A. Guides hold board in alignment with laid tile for accurate measurements.

B. Board adjusts for different types and sizes of tiles.

C. Board provides a cutting surface for vinyl flooring tile.

D. Board provides devices for specfic tasks such as measuring for straight, uneven and corner areas adjacent to structure bases.

Operation FIGS. 3B,5,6,7,9,10,11,13,14,15
reference FIGS. 1,2,3,4,8,12

Measuring arms illustrated. Tile placed into board is measured with measuring arms. See FIG. 2. Example of measuring arm 35 depicts different measuring points 38B for different sizes of tile. Arms 23A & 23B use lines 38, shown in FIG. 1. Arms 23 use small pegs 25 FIG. 1 installed into arms at measuring points 38 for 12" tile. See FIG. 3B which illustrates the process of measuring tile and the transfer of measurements using measuring arms. The illustration depicts 12"×12" tile inserted into board for laying tile into surface area between laid tile 36B and wall 30. With front of the board even with laid tile front edge, arm is extended to contact wall base, a mark is made on tile at measuring point 38. Measurement from wall to laid tile is measurement 42*r.* (See reference numerals.) Tile is marked and cut using measuring point 38 as reference. Then back portion of cut tile is moved forward to lay into area 45A. Measuring arms 23 & 23A work in this manner. Measuring arm 23B also works in this manner, but has a 90 degree elbow and a extension with a off-set probing point for measuring corner wall areas. See FIG. 12.

Figure 5:
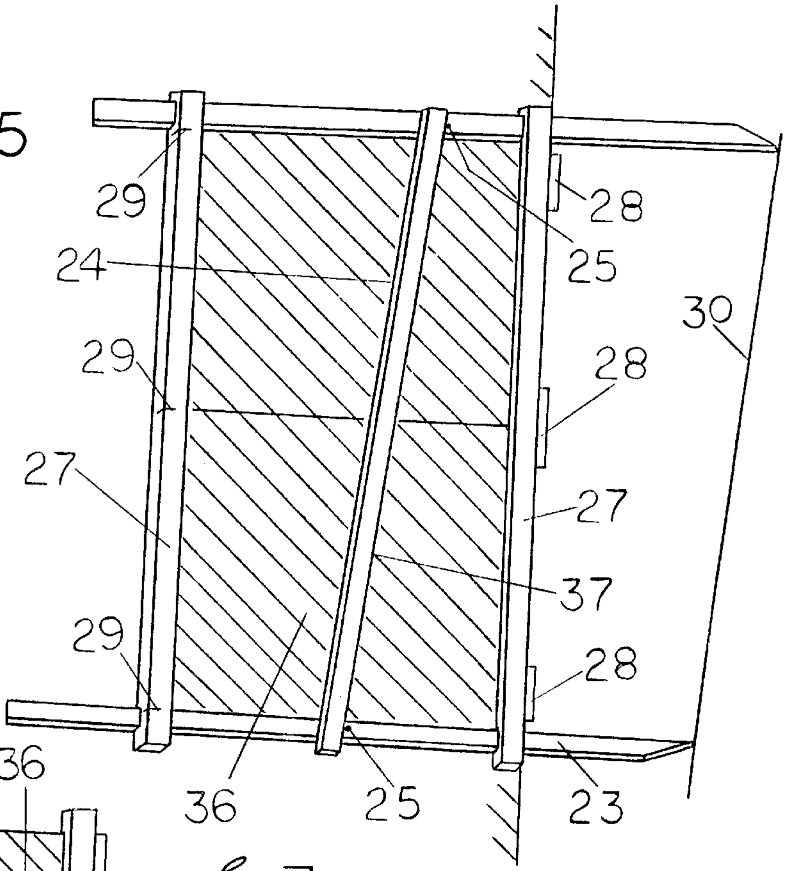
FIGS. 5,6,7 Illustrates top view of laying tile using end measuring arms.
Figure 6:
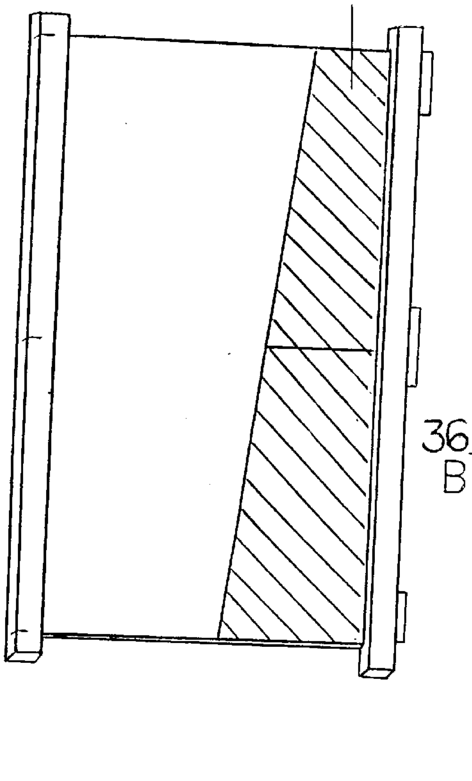
Figure 7:
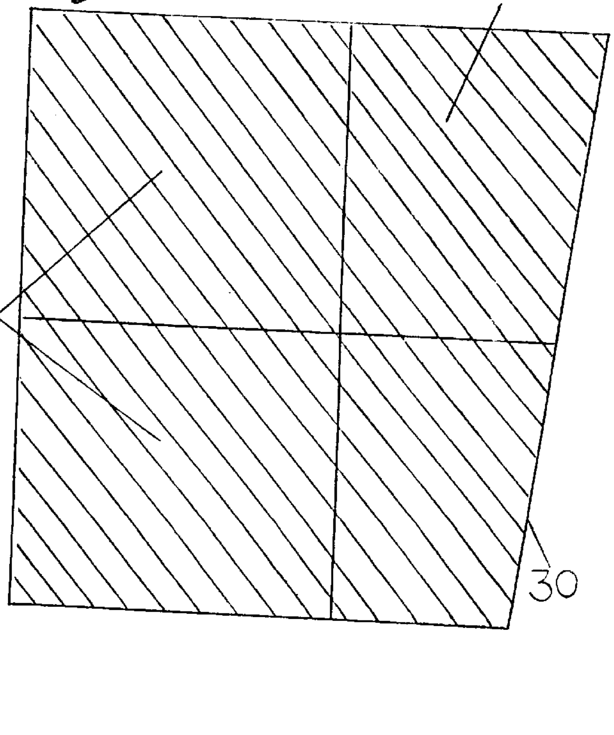

End measuring arms for laying tile FIGS. 5,6,7

End arms 23 are inserted into pilot holes 31 in tracks 27. See FIG. 4. Tile 36 is placed into board. Board is set atop laid tile 36B and aligned in back with laid tile along it's seams with alignment marks 29 on back of rear track. Alignment guides 28 are snubbed into contact with front edge of laid tile 36B to align front of board. See FIG. 3 number 28 sideview. Guides lap over tile edge to hold board in position. Arms 23 are extended to contact wall 30. Straight edge 24 is set atop arms 23 against backside of pegs 25. Tile is now ready to be cut or marked along front of straight edge 24. Tile is cut along line 37. Board is removed and tile 36 is removed from back of board (FIG. 6). To lay tile (FIG. 7) between laid tile 36B and wall 30.

Sliding member and measuring arm FIGS. 9,10,11

Example of laying 12"×12" tile. Tile is placed into board FIG. 9. Board is placed atop laid tile 36B and the guides 28 are aligned in front. Alignment marks 29 on back track are aligned with seams of laid tile 36B at rear of board. Arm 23A is placed atop tracks 27. Sliding member 22 is placed over arm with notches 39 covering arm and overhangs 40 lapping over tracks. See FIG. 8. Slider 22 is then slid along tracks until it is at an end of the board. Arm 23A FIG. 9 is then extended to contact wall 30. A mark is then made on tile at measuring point 38. Slider 22 is then slid toward opposite end of board and as many marks as needed are taken along the lenght of tile. The more uneven the wall line, the more marks will be needed. Marks are then connected and line 37 is drawn. Tile 36 is cut FIG. 10 and board is removed. Tile from back of board is removed. To lay tile 36 (FIG. 11) between laid tile 36 and wall 30.

Sliding member & corner measuring arm

Example of laying 12"×12" tile (FIGS. 13,14,15) into corner. Tile 36 is placed into board. The board is set atop laid tile 36B. The board is positioned so that guides are in contact with front edge of laid tile 36B. Alignment marks 29 on rear track align with seams of laid tile, to align board sides. Measuring arm 23B is placed atop tracks 27 with arm tip on extension pointing towards corner of wall 30. Sliding member 22 is placed atop arm with notches 39 on slider 22 covering arm. Sandwiching arm between tracks and notches, creating pilot holes 31. Slider laps over tracks edges and overhangs 40 tracks 27. See FIG. 12. Slider is then slid to far edge of tile 36 from corner. Arm 23B is then extended to contact wall 30. Mark is made on tile 36 at measuring point 38. Slider is then slid on tracks 27 to touch corner area. Arm is extended to contact the very corner. Mark is made on tile 36 at measuring point 38 on arm. Arm is then retracted as far as possible. Mark is made at measuring point 38 on tile 36.

Marks are connected, line 37 is drawn. Tile is cut (FIG. 14) along line 37. Tile is removed from back of board. The cut piece with corner measurements is for laying into corner area. See FIG. 15.

Conclusion, ramifications and scope

Acordingly, the reader will see that the tile marking device board of this invention can be used easily to measure tile for areas adjacent to structure bases. Furthermore, the combination of instrument board and instruments have additional advantages in that It allows easy measurement of difficult to measure structure bases for tile laying.

It allows easy measurement of inside and outside corners for tile laying.

It accepts ceramic and vinyl flooring tiles for measuring and marking for laying.

It is much faster than devices in present use and traditional methods.

It is a very accurate combination of instruments and instrument board for tile.

Although the description above contains many specificities, these should not be construed as limiting the scope of the invention, but merely providing illustrations of some of the presently preferred embodiments of this invention. For example the instrument board can be manufactured to accept only one tile. It also can be added to in length to measure long lengths of walls. The instrument board for example can be manufactured in a 10 foot length to measure a 12 foot wall for the laying of tile. It can be manufactured to measure several tiles at once. It would be very beneficial for commercial purpose.

Thus the scope of the invention should be determined by the appended claims and their legal equivalents, rather than by the examples given.

I claim:

1. An instrument board and instruments combination for measuring and marking various sizes and types of tiles with measurements of surface area from a central laid portion of tiled floor edge to a structure base, comprising:

(a) a body having front, rear, left and right ends of rigid material, having (b) a base of sufficient size to place various sizes of said tiles thereon for measuring and marking, and (c) a plurality of tracks at front and rear of said body atop and incorporated into said base respectively with surface of said base to dispose said tile thereon between said tracks, (d) means for adjustment of said base in respect to size and type of said tile disposed into said body upon said base between said tracks, (e) alignment means for said body to align with said central laid portion of tiled floor edge with reference of alignment disposed on said tracks, (f) a plurality of measuring arms with probing tips and reference of tile sizes thereon being disposed parallel and contiguous with said body, and (g) means for measurement of tile laying surface area adjacent to structure bases of varying regularity with said measuring arms and said measurement being disposed onto said tile upon said base, (h) whereby said instrument board and instruments combination enables measuring and marking various said tiles for laying adjacent to said structure bases of varying regularity.

2. The instrument board and instruments combination of claim 1 wherein said adjustment means is a plurality spacer members of predetermined sizes that install into said body atop said base disposed against rear said track thereon for reducing width of said base area where tile is disposed such that ceramic tiles of various size have correct positioning upon said base.

3. The instrument board and instruments combination of claim 2 wherein said adjustment means further includes a cutting surface member that installs disposed atop said base and covers entire surface thereon between said tracks so that to provide a cutting surface for cutting vinyl flooring tile.

4. The instrument board and instruments combination of claim 3 wherein said alignment means is a plurality of alignment guides disposed on said front track overhanging bottom of said body such that for contacting a tiled floor edge adjacent to structure so that said body may be aligned in respect to said tiled floor and structure base and further including a plurality of alignment marks disposed on rear said track so that to align said body with seams of a previously tiled floor.

5. The instrument board and instruments combination of claim 4 wherein said tracks extend a predetermined distance past said left and right body ends and are parallel, with said base between thereof.

6. The instrument board and instruments combination of claim 5 wherein said tracks further includes a plurality of pilot holes disposed into front through back sides of both said tracks disposed at both ends therein in alignment respectively.

7. The instrument board and instruments combination of claim 6 wherein said pilot holes are a guideway for inserting said measuring arms therein disposed at sides of said body such that said measuring arms are slidable within said pilot holes.

8. The instrument board and instruments combination of claim 7 wherein said means for measurement further includes a straight member that may be disposed over a tile on said base atop said measuring arms at said reference of tile sizes for a line of reference whereby said measuring arms extend to contact said structure base for measurement of area between a central laid portion of tiled floor edge and said structure base and reference of measurement being along said line of reference of said straight member so that a tile may be marked for laying.

9. The instrument board and instruments combination of claim 8 wherein further includes a sliding member that may be disposed atop said body and attaches to said front and rear tracks thereof lapping over and overhanging said tracks thereof having slidable atop said tracks such that said sliding member may be slid from left to right atop said tracks thereof has a notch in front and rear so that a measuring arm may be inserted whereby said sliding member may be slid atop said body and said measuring arm may be extended and retracted to measure uneven surface area so that a tile may be marked with variable measurements.

10. The instrument board and instruments combination of claim 9 wherein further including a corner measuring arm with an elbow that may be inserted into said sliding member within said notches sandwiching between said tracks and said sliding member with slidable therein such that said sliding member may be slid from right to left of said body and said corner measuring arm may be extended and retracted whereby a corner surface area may be measured to mark a tile with such measurements.

* * * * *